United States Patent
Seo et al.

(10) Patent No.: US 9,510,075 B2
(45) Date of Patent: Nov. 29, 2016

(54) WATERPROOF SOUND TRANSMITTING SHEET, AND METHOD FOR PRODUCING SAME

(71) Applicant: Amogreentech Co., Ltd., Gyeonggi-do (KR)

(72) Inventors: In-Yong Seo, Seoul (KR); Seung-Hoon Lee, Gyeonggi-do (KR); Jun-Sik Hwang, Incheon (KR); Yong-Sik Jung, Gyeonggi-do (KR); Kyung-Su Kim, Gyeonggi-do (KR)

(73) Assignee: Amogreentech Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/381,655

(22) PCT Filed: Dec. 11, 2013

(86) PCT No.: PCT/KR2013/011496
§ 371 (c)(1),
(2) Date: Aug. 28, 2014

(87) PCT Pub. No.: WO2014/092461
PCT Pub. Date: Jun. 19, 2014

(65) Prior Publication Data
US 2015/0014088 A1    Jan. 15, 2015

(30) Foreign Application Priority Data

Dec. 11, 2012 (KR) .......... 10-2012-0143371
Dec. 11, 2013 (KR) .......... 10-2013-0154023

(51) Int. Cl.
*H04R 1/08* (2006.01)
*H04R 1/10* (2006.01)
(Continued)

(52) U.S. Cl.
CPC ............. *H04R 1/086* (2013.01); *B05D 1/02* (2013.01); *B05D 1/18* (2013.01); *B05D 1/26* (2013.01);
(Continued)

(58) Field of Classification Search
CPC .. H04R 1/086; H04R 1/023; H04R 2410/07; G10K 11/18; D01D 5/0007; D01D 5/0023; D01D 5/003
USPC ........ 181/175, 211, 126, 128, 129; 381/325, 381/334
See application file for complete search history.

(56) References Cited

U.S. PATENT DOCUMENTS 4,071,040 A * 1/1978 Moriarty ............. H04M 1/03
137/199
4,987,597 A * 1/1991 Haertl ............. H04R 25/654
381/325
(Continued)

FOREIGN PATENT DOCUMENTS

CN  101795858  8/2010
CN  101990493  3/2011
(Continued)

OTHER PUBLICATIONS

European Patent Application No. 13862024.0-1303/2808165: Extended European Search Report dated Feb. 9, 2015, 6 pages.
(Continued)

*Primary Examiner* — Edgardo San Martin
(74) *Attorney, Agent, or Firm* — Baker & Hostetler LLP

(57) ABSTRACT

Disclosed herein is a waterproof sound-transmitting sheet having high sound transfer efficiency and excellent water proofing performance and a method for producing same. The waterproof sound-transmitting sheet includes: a sound-transmitting layer made of a polymer material and formed in the shape of a web having a plurality of pores; and a coating layer formed on at least one side of the sound-transmitting layer to block pores existing on the surface of the sound-transmitting layer.

9 Claims, 3 Drawing Sheets

(51) Int. Cl.
*G10K 11/18* (2006.01)
*B32B 37/24* (2006.01)
*B05D 1/02* (2006.01)
*B05D 1/18* (2006.01)
*B05D 1/26* (2006.01)
*D01D 5/00* (2006.01)
*D06M 23/00* (2006.01)
*D01F 6/12* (2006.01)
*H04R 1/02* (2006.01)
*H04R 1/00* (2006.01)

(52) U.S. Cl.
CPC ............. *B32B 37/24* (2013.01); *D01D 5/0007* (2013.01); *D01F 6/12* (2013.01); *D06M 23/00* (2013.01); *G10K 11/18* (2013.01); *H04R 1/023* (2013.01); *B05D 2201/02* (2013.01); *B05D 2506/10* (2013.01); *B32B 2037/243* (2013.01); *B32B 2307/10* (2013.01); *B32B 2307/73* (2013.01); *B32B 2457/00* (2013.01); *G10K 2210/10* (2013.01); *H04R 2499/00* (2013.01)

(56) References Cited

U.S. PATENT DOCUMENTS

| | | | | |
|---|---|---|---|---|
| 5,342,434 A * | 8/1994 | Wu | ............... | A41D 31/0011 428/308.4 |
| 5,460,872 A * | 10/1995 | Wu | ............... | B01D 39/1692 428/304.4 |
| 5,462,586 A * | 10/1995 | Sugiyama | ............ | B01D 39/083 55/524 |
| 5,814,405 A * | 9/1998 | Branca | ............... | B01D 39/1692 264/127 |
| 5,828,012 A * | 10/1998 | Repolle | ............... | H04R 1/023 181/175 |
| 6,512,834 B1 * | 1/2003 | Banter | ............... | H04R 1/086 381/189 |
| 6,932,187 B2 * | 8/2005 | Banter | ............... | H04R 1/086 181/149 |
| 7,702,124 B2 * | 4/2010 | Niederdraenk | ........ | H04R 1/086 381/322 |
| 7,771,818 B2 * | 8/2010 | Klare | ............... | C08J 5/2293 210/500.21 |
| 7,927,405 B2 * | 4/2011 | Bacino | ............... | B01D 46/54 210/640 |
| 8,141,678 B2 * | 3/2012 | Ikeyama | ............... | C09J 7/0282 181/167 |
| 8,157,048 B2 * | 4/2012 | Banter | ............... | H04R 1/023 181/149 |
| 8,272,517 B2 * | 9/2012 | Horie | ............... | B32B 5/32 156/229 |
| 8,685,198 B2 * | 4/2014 | Mietta | ............... | B32B 3/266 156/291 |
| 8,731,618 B2 * | 5/2014 | Jarvis | ............... | F16F 1/027 267/164 |
| 8,739,926 B1 * | 6/2014 | Mori | ............... | G10K 11/18 181/286 |
| 8,846,161 B2 * | 9/2014 | Linford | ............... | B05D 1/36 427/535 |
| 9,038,773 B2 * | 5/2015 | Banter | ............... | G10K 11/002 181/286 |
| 9,044,706 B2 * | 6/2015 | Furuyama | ............ | B01D 39/1692 |
| 2009/0176056 A1 * | 7/2009 | Marin | ............... | A41D 31/02 428/141 |
| 2010/0247857 A1 * | 9/2010 | Sanami | ............... | H04M 1/18 428/138 |
| 2011/0209265 A1 * | 9/2011 | Komada | ............... | A42B 1/048 2/202 |
| 2013/0083528 A1 * | 4/2013 | Huang | ............... | B32B 27/065 362/249.01 |
| 2013/0084447 A1 * | 4/2013 | Shimatani | ............ | B01D 69/02 428/220 |
| 2015/0001000 A1 * | 1/2015 | Seo | ............... | G10K 11/18 181/211 |
| 2015/0070842 A1 * | 3/2015 | Lee | ............... | D01D 5/0038 361/692 |

FOREIGN PATENT DOCUMENTS

| | | |
|---|---|---|
| CN | 102318367 | 1/2012 |
| JP | 10165787 A * | 6/1998 |
| JP | 2004-328231 | 11/2004 |
| JP | 2010-241047 | 10/2010 |
| KR | 10-2009-0128104 | 12/2009 |
| KR | 10-2009-0130566 A | 12/2009 |
| KR | 10-2010-0024119 | 3/2010 |
| KR | 10-2010-0041839 | 4/2010 |
| KR | 10-2010-0112615 | 10/2010 |
| KR | 10-2011-0063492 | 6/2011 |
| KR | 10-2012-0028693 | 3/2012 |
| WO | WO 2011/132062 A1 | 10/2011 |
| WO | WO 2012/002754 | 1/2012 |

OTHER PUBLICATIONS

Office Action of Japanese Patent Office dated Aug. 18, 2015, in Application No. 2014559848.

* cited by examiner

WATERPROOF SOUND TRANSMITTING SHEET, AND METHOD FOR PRODUCING SAME

CROSS-REFERENCE TO RELATED APPLICATIONS

This application is the National Stage of International Application No. PCT/KR2013/011496, filed Dec. 11, 2013, which claims the benefit of and priority to Korean application No. 10-2012-0143371, filed Dec. 11, 2012 and Korean application No. 10-2013-0154023, filed Dec. 11, 2013, the entireties of which applications are incorporated herein by reference for any and all purposes.

TECHNICAL FIELD

The present invention relates to a waterproof sound-transmitting sheet and a method for producing same. More particularly, the present invention relates to a waterproof sound-transmitting sheet having a high sound transmitting efficiency and excellent waterproofness, and a method for producing the same.

BACKGROUND ART

Recently, mobile electronic appliances, such as portable terminals, digital cameras and notebooks, have increasingly been used. Such a mobile electronic appliance needs to have a waterproofing property because it is used while being carried. However, such a mobile electronic appliance is configured such that a sound hole is formed in its portion to be provided with a speaker or microphone, and water or dust infiltrates into the mobile electronic appliance through the sound hole.

Therefore, the sound hole is provided therein with a waterproof sound-transmitting sheet for transmitting sound and blocking water or dust. Such a waterproof sound-transmitting sheet must be produced in consideration of both a waterproofing property and a sound transmitting efficiency.

In relation thereto, Korean Patent Application Publication No, 10-2010-0041839 (Apr. 22, 2010) discloses a waterproof sound-transmitting sheet made of a porous polytetrafluoroethylene film. However, this conventional waterproof sound-transmitting sheet is problematic in that, since it is composed of only a porous polytetrafluoroethylene film, the micropores of the porous polytetrafluoroethylene film are enlarged by externally-applied impact or sound pressure depending on the increase in the period of sheet usage, thus deteriorating the waterproofing performance thereof.

DISCLOSURE

Technical Problem

Accordingly, the present invention has been devised to solve the above-mentioned problem, and the present invention intends to provide a nonporous waterproof sound-transmitting sheet having improved waterproofing performance, and a method for producing same.

Further, the present invention intends to easily adjust the thickness of the waterproof sound-transmitting sheet. Particularly, the present invention intends to maximize the sound-transmitting performance of the waterproof sound-transmitting sheet by easily making a sound-transmitting layer thin.

Technical Solution

In order to accomplish the above objects, an aspect of the present invention provides a waterproof sound-transmitting sheet, including: a sound-transmitting layer made of a polymer material and formed in the shape of a web having a plurality of pores; and a coating layer formed on at least one side of the sound-transmitting layer to block pores existing on the surface of the sound-transmitting layer.

Here, the sound-transmitting layer may be formed by electrospinning the polymer material.

Further, the polymer material may include polyvinylidene difluoride (PVDF).

Further, the coating layer may be formed on at least one side of the sound-transmitting layer using any one selected from among a gravure coating process, a dipping process and a spray process, so as to block pores existing on the surface of the sound-transmitting layer.

Further, the coating layer may include: a first coating layer formed on one side of the sound-transmitting layer to block pores existing on the surface of one side of the sound-transmitting layer; and a second coating layer formed on the other side of the sound-transmitting layer to block pores existing on the surface of the other side of the sound-transmitting layer.

Further, the total air permeability of the sound-transmitting layer and the coating layer may be less than 0.1 cfm at 12.5 psi.

Another aspect of the present invention provides a method for producing a waterproof sound-transmitting sheet, including the steps of: electrospinning a polymer material to form a webbed sound-transmitting layer having a plurality of pores; and forming a coating layer on at least one side of the sound-transmitting layer to block pores existing on the surface of the sound-transmitting layer.

Here, in the step of forming the coating layer, the coating layer may be formed on at least one side of the sound-transmitting layer using any one selected from among a gravure coating process, a dipping process and a spray process, so as to block pores existing on the surface of the sound-transmitting layer.

Further, the polymer material may include polyvinylidene difluoride (PVDF).

Advantageous Effects

The waterproof sound-transmitting sheet according to the present invention has improved waterproofing performance.

Further, the total thickness of the waterproof sound-transmitting sheet can be easily adjusted because it is formed by electrospinning. Particularly, the waterproofing performance of the waterproof sound-transmitting sheet can be improved by making the sound-transmitting layer thin. Moreover, since the thickness of the waterproof sound-transmitting sheet can be easily adjusted, the air permeability thereof can also be easily adjusted, thus realizing excellent sound characteristics.

BEST MODE

Figure 1:
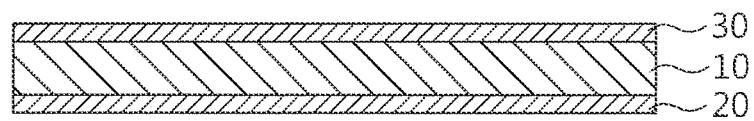
FIG. 1 is a sectional view showing the structure of a waterproof sound-transmitting sheet according to an embodiment of the present invention.

Hereinafter, preferred embodiments of the present invention will be described in detail with reference to the attached drawings. Here, when it is determined that the detailed description of the related art would obscure the gist of the present invention, the description thereof will be omitted. Embodiments of the present invention are provided in order to more clearly explain the present invention to those skilled in the art. Therefore, the shapes, sizes and the like of the elements in the drawing may be exaggerated for more clearly explaining the present invention.

Hereinafter, a waterproof sound-transmitting sheet according to an embodiment of the present invention will be described in detail.

FIG. 1 is a sectional view showing the structure of a waterproof sound transmitting sheet according to an embodiment of the present invention.

Referring to FIG. 1, the waterproof sound-transmitting sheet 100 according to an embodiment of the present invention includes a sound-transmitting layer 10, a first coating layer 20 and a second coating layer 30.

The sound-transmitting layer 10 is made of a polymer material, and is formed in the shape of a web having a plurality of pores. In this case, the polymer material forming the sound-transmitting layer 10 includes polyinylidene difluoride (PVDF).

Moreover, the polymer material may include: polyamide, polyimide, polyamideimide, poly(meta-phenylene isophthalamide), polysulfone, polyether ketone, polyether imide, aromatic polyesters such as polyethylene terephthalate, polytrimethylene terephthalate and polyethylene naphthalate, polytetrafluoroethylene, polyphosphazenes such poly-diphenoxyphosphazene and poly{bis[2-(2-methoxyethoxy) phosphazene]}, polyurethane and copolymers thereof, cellulose acetate, cellulose acetate butylate, and cellulose acetate propionate. Further, the polymer material may also include: polyvinylidenefluoride (PVDF), poly(vinylidene-fluoride-co-hexafluoropropylene), perfluoropolymers, polyvinylchloride or polyvinylidenechloride and copolymers thereof, polyethyleneglycol derivatives including polyethyleneglycol dialkyl ether and polyethyleneglycol dialkyl ester, poly(oxymethylene-oligo-oxyethylene), polyoxides including polyethylene oxide and polypropylene oxide, polyvinyl acetate, poly(vinylpyrrolidone-vinylacetate), polystyrene and a polystyrene-acrylonitrile copolymer, polyacrylontrile, a polyacrylonitrile-methylmethacrylate copolymer, polymethylmethacrylate, a polymethylmethacrylate copolymer, and mixtures thereof.

The sound-transmitting layer 10 may be formed by electrospinning the polymer material. As such, the thickness of the sound-transmitting layer 10 is easily adjusted because it is formed by electrospinning. Particularly, the total sound transmitting property of the waterproof sound-transmitting sheet 100 becomes excellent, because the thickness of the sound-transmitting layer 10 is easily decreased by an electrospinning process. That is, a porous waterproof sound-transmitting sheet is relatively somewhat sensitive to the degree of the thickness thereof because sound is transferred through pores. In contrast, the nonporous waterproof sound-transmitting sheet 100 can effectively transfer sound vibration from one side thereof to the other side thereof only when it is made thin.

Further, the nonporous waterproof sound-transmitting sheet 100 can exhibit high waterproofing performance compared to a waterproof sound-transmitting sheet including a porous sound-transmitting layer because it includes the nonporous sound-transmitting layer 10.

The first coating layer 20 is formed on one side of the sound-transmitting layer 10. Further, the first coating layer 20 is configured to block the pores existing on the surface of the sound-transmitting layer 10. This first coating layer 20 may be formed on the surface of the sound-transmitting layer 10 by gravure coating.

The second coating layer 30 is formed on the other side of the sound-transmitting layer 10. This second coating layer 30 may be made of the same polymer material as the first coating layer 20, except that the position of the second coating layer 30 is different from that of the first coating layer 20 with respect to the sound-transmitting layer 10. Therefore, a detailed description of the second coating layer 30 is replaced by that of the first coating layer 20.

The waterproof sound-transmitting sheet 100 according to an embodiment of the present invention is configured such that the first coating layer 20 and the second coating layer 30 are formed on both sides of the sound-transmitting layer 10, but may be configured such that a coating layer is formed on only one side of the sound-transmitting layer 10 according to the kind of appliances thereof. In this case, the waterproof sound-transmitting sheet 100 including the first coating layer 20, the sound-transmitting layer 10 and the second coating layer 30 may be formed to have an air permeability of 0.1 cfm at 125 psi.

This waterproof sound-transmitting sheet 100, which is a nonporous waterproof sound-transmitting sheet, is configured such that air is not transferred from one side thereof to the other side thereof.

Hereinafter, a method for producing a waterproof sound-transmitting sheet according to an embodiment of the present invention will be described.

Figure 2:
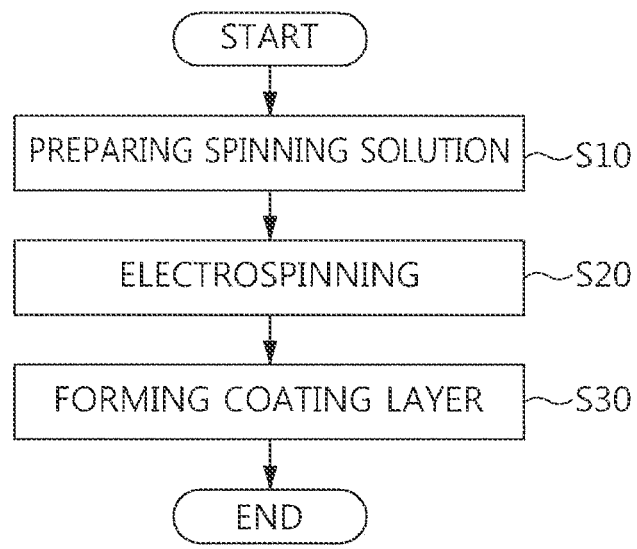
FIG. 2 is flowchart explaining a method for producing a waterproof sound-transmitting sheet according to an embodiment of the present invention.
Figure 3:
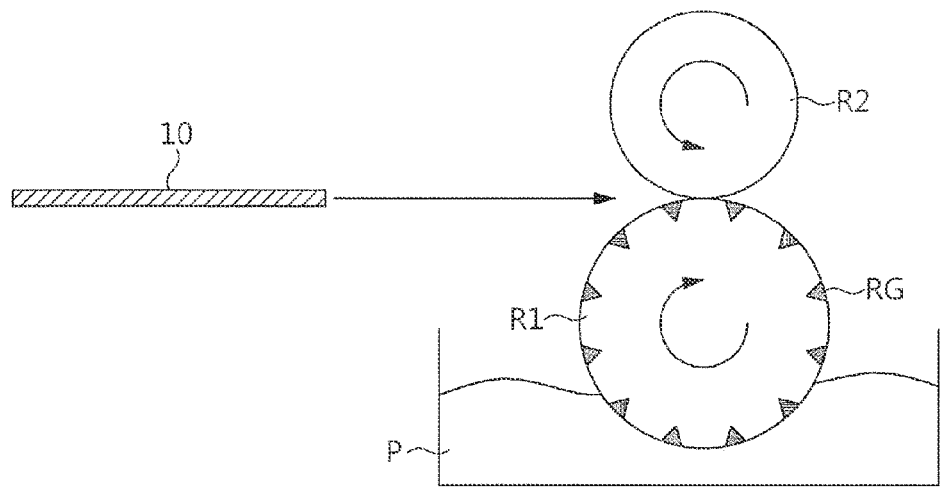
FIG. 3 is a schematic view explaining a gravure coating process in the method for producing a waterproof sound-transmitting sheet according to an embodiment of the present invention.
Figure 4:
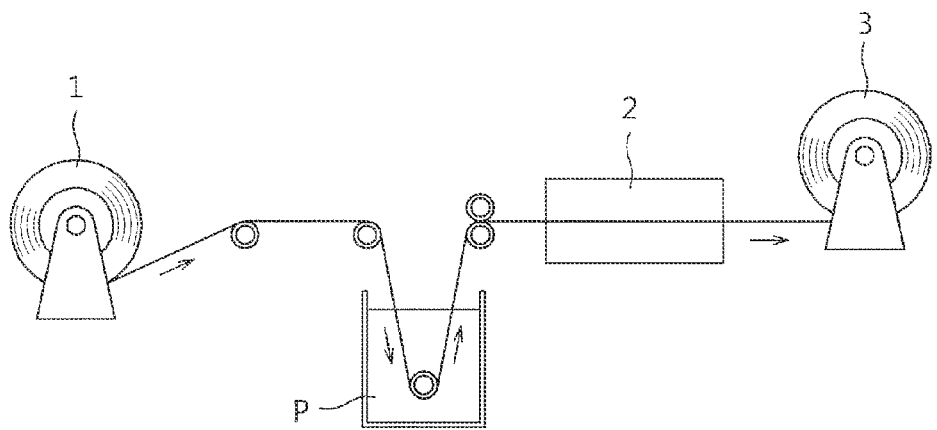
FIG. 4 is a schematic view explaining a dipping process in the method for producing a waterproof sound-transmitting sheet according to an embodiment of the present invention.

FIG. 2 is a flowchart explaining a method for producing a waterproof sound-transmitting sheet according to an embodiment of the present invention. FIG. 3 is a schematic view explaining a gravure coating process in the method for producing a waterproof sound-transmitting sheet according to an embodiment of the present invention. FIG. 4 is a schematic view explaining a dipping process in the method for producing a waterproof sound-transmitting sheet according to an embodiment of the present invention.

Referring to FIG. 2, in the method for producing a waterproof sound-transmitting sheet according to an embodiment of the present invention, first, a spinning solution including a polymer material is prepared (S10). In this case, the polymer material may include polyinylidene difluoride (PVDF).

Subsequently, the spinning solution prepared in step S10 is applied by electrospinning to form a webbed sound-transmitting layer (S20).

Thereafter, the surface of the sound-transmitting layer formed in step S20 is gravure-coated to form a coating layer on at least one side of the sound-transmitting layer (S30). In this case, the coating layer is configured to block the pores existing on the surface of the sound-transmitting layer.

Explaining the gravure coating process in detail with reference to FIG. 3, first, the sound-transmitting layer 10 is passed between a first roller (R1) and a second roller (R2). In this case, the first roller (R1) is partially immersed in a coating solution (P), and is provided on the surface thereof with a plurality of recessed grooves (RG). The coating solution (P) is infiltrated into the recessed grooves (RG) by the rotation of the first roller (R1), and the surface of the sound-transmitting layer 10 is coated with the coating solution (P) by heat and pressure at the portion thereof being in contact with the second roller (R2).

Meanwhile, referring to FIG. 4, step S30 may be performed using a dipping process instead of a gravure coating process. That is, the sound-transmitting layer wound on a supply roll 1 is passed through a coating solution (P), dried by a dryer 2 and then squeezed by a squeeze roll 3 to form a coating layer for blocking the pores existing on the surface of the sound-transmitting layer.

Moreover, step S30 may also be performed using a spray process instead of a gravure coating process. That is, the coating solution (P) is applied to the surface of the sound-transmitting layer by a spray nozzle to form a coating layer for blocking the pores existing on the surface of the sound-transmitting layer.

After the step S30, The oleophobic treatment of the nonporous waterproof sound-transmitting sheet may further be conducted.

Figure 5:
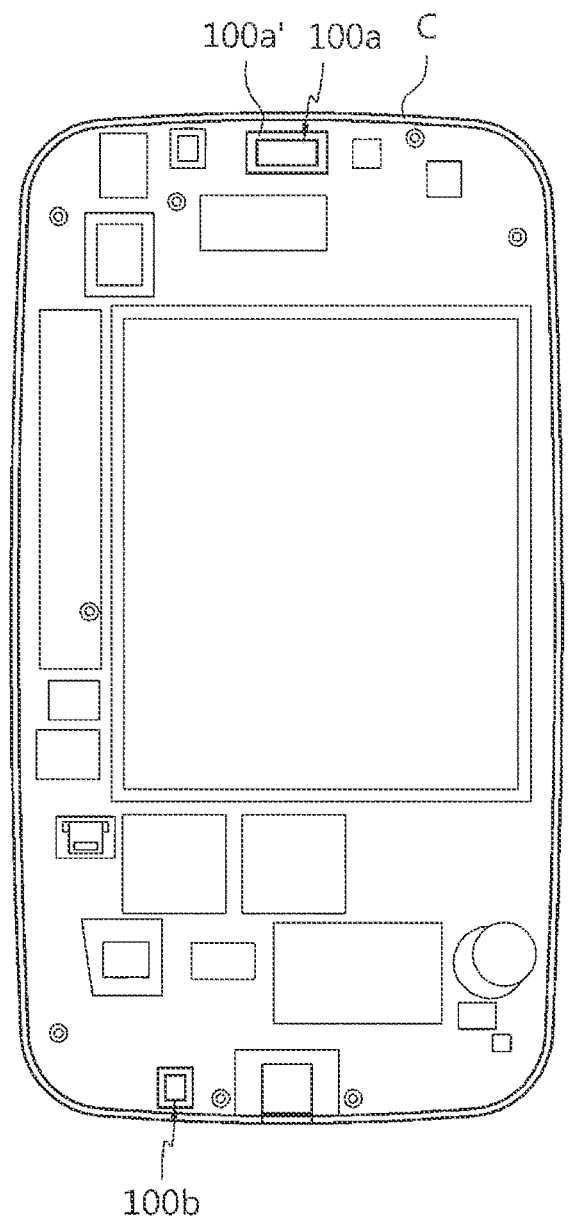
FIG. 5 is a schematic view showing an electronic appliance provided with the waterproof sound-transmitting sheet according to the embodiment of the present invention.

FIG. 5 is a schematic view showing an electronic appliance provided with the waterproof sound-transmitting sheet according to the embodiment of the present invention.

Referring to FIG. 5, the inside of the case (C) of an electronic appliance, that is, a mobile terminal is shown. In the case (C) of the mobile terminal, the waterproof sound-transmitting sheet 100a or 100b according to an embodiment of the present invention is applied to a sound hole, that is, a mike or speaker hole. In this case, a support frame 100a' for supporting a shape may be formed on the circumference of the waterproof sound-transmitting sheet 100a. In FIG. 5, the full lines in the case (C) indicate circuits, cases and the like formed in the mobile terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A nonporous waterproof sound-transmitting sheet, comprising:
   a porous sound-transmitting layer made of a polymer material and formed in the shape of a web having a plurality of pores; and
   a nonporous coating layer formed on at least one surface of the porous sound-transmitting layer to block pores existing on the surface of the porous sound-transmitting layer
   wherein the porous sound-transmitting layer is formed by electrospinning the polymer material.

2. The nonporous waterproof sound-transmitting sheet of claim 1, wherein the polymer material includes polyvinylidene difluoride (PVDF).

3. The nonporous waterproof sound-transmitting sheet of claim 1, wherein the nonporous coating layer is formed by a gravure coating process, a dipping process, or a spray process.

4. The nonporous waterproof sound-transmitting sheet of claim 1, wherein the total air permeability of the porous sound-transmitting layer and the nonporous coating layer is less than 0.1 cfm at 125 psi.

5. A method for producing a nonporous waterproof sound-transmitting sheet, comprising the steps of:
   electrospinning a polymer material to form a porous sound-transmitting layer formed in the shape of a web having a plurality of pores; and
   forming a nonporous coating layer on at least one surface of the porous sound-transmitting layer to block pores existing on the surface of the porous sound-transmitting layer.

6. The method of claim 5, wherein the nonporous coating layer is formed by a gravure coating process, a dipping process, or a spray process.

7. The method of claim 5, wherein the polymer material includes polyvinylidene difluoride (PVDF).

8. An electronic appliance, comprising the nonporous waterproof sound-transmitting sheet of claim 1, which is attached to a sound hole thereof.

9. The nonporous waterproof sound-transmitting sheet of claim 1, wherein the nonporous coating layer comprises:
   a first nonporous coating layer formed on one surface of the porous sound-transmitting layer, and
   a second nonporous coating layer formed on the other surface of the porous sound-transmitting layer.

* * * * *